United States Patent [19]

Summers

[11] 4,351,202
[45] Sep. 28, 1982

[54] ENGINE

[76] Inventor: Robert F. Summers, 7945 Wellington St., Elmwood Park, Ill. 60635

[21] Appl. No.: 694,049

[22] Filed: Jun. 7, 1976

Related U.S. Application Data

[63] Continuation of Ser. No. 879,439, Nov. 24, 1969, abandoned, Ser. No. 755,761, Aug. 8, 1968, abandoned, Ser. No. 694,024, Dec. 20, 1967, abandoned, Ser. No. 351,280, Mar. 9, 1964, abandoned, and Ser. No. 66,181, Oct. 31, 1960, abandoned, said Ser. No. 879,439, is a continuation-in-part of Ser. No. 755,761, , which is a continuation of Ser. No. 694,024, , which is a continuation-in-part of Ser. No. 351,280, , which is a continuation-in-part of Ser. No. 66,181.

[51] Int. Cl.³ .................... F16H 57/02; F16C 3/04; F02B 75/06
[52] U.S. Cl. .......................... 74/604; 74/603; 74/595; 123/53 A; 123/192R; 123/192 B
[58] Field of Search ................ 74/603, 604, 595, 597; 123/192 R, 192 B, 53 A

[56] References Cited

U.S. PATENT DOCUMENTS

| | | | |
|---|---|---|---|
| 617,978 | 1/1899 | Winton | 74/604 |
| 636,606 | 11/1899 | Winton | 74/604 X |
| 1,095,675 | 5/1914 | Rietti | 74/604 |
| 1,310,090 | 7/1919 | Ricardo | 74/604 |
| 1,342,648 | 6/1920 | Ricardo | 74/604 |
| 1,762,860 | 6/1930 | Gilbert | 74/604 |
| 1,794,715 | 3/1931 | Knight | 74/604 |
| 1,851,669 | 3/1932 | Griswald | 74/604 |
| 2,280,384 | 4/1942 | Dickson | 74/604 |
| 3,112,658 | 12/1963 | Berlyn | 123/192 |

FOREIGN PATENT DOCUMENTS

| | | | |
|---|---|---|---|
| 13774 | 3/1956 | Fed. Rep. of Germany | 123/192 R |
| 954019 | 12/1956 | Fed. Rep. of Germany | 123/192 |
| 964777 | 5/1957 | Fed. Rep. of Germany | 74/604 |

OTHER PUBLICATIONS

The Balancing of Engines, W. E. Dalley 4th Ed. 1929 pp. 94-97, 102, 103, 128 and 129.

Primary Examiner—Leslie Braun
Attorney, Agent, or Firm—Wegner, Stellman, McCord, Wiles & Wood

[57] ABSTRACT

A balancing mechanism in a conventional, multicylinder engine consisting of a mass linked to the static portion of the engine and dynamically linked to the engine crankshaft in such a manner as to establish an arcuate oscillation of the mass on rotation of the crankshaft for producing a primary harmonic shaking force and a secondary harmonic shaking force in the direction of greatest travel of the mass, and a secondary harmonic shaking force in a direction at right angles to said first-mentioned direction with these harmonic shaking forces adapted to balance other shaking forces developed within the engine. A crank-and-rocker mechanism is utilized in the balancing mechanism and the angular disposition thereof may be related to the position of maximum value of the engine harmonic shaking forces as distinguished from the dead center position of the engine.

18 Claims, 10 Drawing Figures

ENGINE

CROSS-REFERENCE TO RELATED APPLICATIONS

This application comprises a continuation of cognate applications, Ser. Nos. 66,181, filed Oct. 31, 1960 and now abandoned; 351,280 filed Mar. 9, 1964 as a continuation-in-part of Appln. Ser. No. 66,181, and now abandoned; 694,024 filed Dec. 20, 1967 as a continuation-in-part of Appln. Ser. No. 351,280, and now abandoned; 755,761 filed Aug. 8, 1968 as a continuation of Appln. Ser. No. 694,024, and now abandoned; and 879,439 filed Nov. 24, 1969 as a continuation-in-part of Appln. Ser. No. 755,761, and now abandoned, all of applicant and all entitled ENGINE.

BACKGROUND OF THE INVENTION

The present invention relates to internal-combustion engines. More particularly, this invention relates to balancing means for internal-combustion engines capable of balancing the principal types of dynamic unbalance created in such engines.

The principal application considered is for engines used to power automobiles. Automotive engines have several important requirements to meet in addition to that of producing power. For example, they must be compact in order to leave as much space as possible for the passenger compartment and for important accessory equipment. In addition, automotive engines must operate at high speed with a minimum of vibration. In order to accomplish this, the engine must have a high degree of balance in its moving parts.

The balance of automotive engines of the piston or reciprocating type is complicated because of the reciprocating motion of the piston. This motion has two important harmonics. The primary harmonic results in a shaking force which varies through a cycle having a frequency equal to the speed of rotation of the crankshaft. The secondary harmonic results in a smaller shaking force having a frequency equal to twice the speed of the crankshaft.

In a multicylinder engine, the shaking forces produced by the reciprocating parts are balanced as much as possible by causing the shaking forces from the separate cylinders to oppose each other, usually in the form of opposing couples. This is easier to accomplish with a larger number of cylinders, because more cylinders give more possibilities for obtaining a favorable arrangement of cranks. Eight cylinders have been found to afford several different acceptable engine configurations, all having complete primary and secondary balance. An example is the ninety-degree, V-8 engine. This type has been widely adopted in the larger American automobiles, because in addition to having good balance, it is a very compact engine.

Six cylinders afford fewer configurations having the desired balance for automotive use than eight cylinders. A common type of six-cylinder engine is the in-line six. This engine has acceptable balance, but it is undesirably long for engine compartments. The V-6 engine, on the other hand, is more compact but it does not have complete primary and secondary balance without the use of an auxiliary balancing device.

Four cylinders has long been considered an ideal number for an economical engine for a small automobile. However, when the number of cylinders is reduced to four, it is no longer possible to obtain any configuration of four-cycle engine having complete primary and secondary balance without the use of an auxiliary balancing device. The most common type of four-cylinder engine for automobiles is the in-line four. In this type of engine, the secondary shaking forces add to each other instead of opposing each other. The result is that this engine has a fairly large secondary shaking force in the plane of the cylinders. This shaking force can give a perceptible vibration to an automobile at moderate highway speeds.

It has long been known that the secondary shaking forces of an in-line, four-cylinder engine can be balanced by the use of auxiliary balance shafts, which rotate at twice engine speed. This type of balancing means, however, has not been adopted to any significant extent, possibly because of its expense and operational problems.

Dimensional considerations and also cost considerations would indicate that a preferred type of engine for a small automobile would be a V-4 engine. V-4 engines are indeed indicated in the prior art. The balance of these engines has been notably poor, however. Generally, these engines have a combination of unbalanced primary couples, unbalanced secondary couples, and unbalanced secondary forces. Because of the unbalance of V-4 engines, their use has generally been limited to industrial-type applications, where a greater amount of vibration can be tolerated than in automobiles.

Another undesirable characteristic of reciprocating engines is cyclic variation of output torque. Such variation is sometimes perceptible in automobiles in the form of a vibration. An important part of this torque variation is the inertia torque produced by reciprocating parts in the engine cylinder. Cyclic variation of inertia torque is worse in four-cylinder engines than it is in engines having a greater number of cylinders. This is due to the fact that the inertia torques from all cylinders add to each other in even-firing, four-cylinder engines. All conventional four-cylinder engines, therefore, have this disadvantage.

SUMMARY OF THE INVENTION

In order to provide a compact engine having fewer than six cylinders and no objectionable unbalance, it is apparent that some kind of auxiliary balancing means is necessary.

It is, therefore, an object of this invention to provide an improved, compact, internal-combustion engine.

Another object of this invention is to provide an improved, compact, dynamically-balanced, internal-combustion engine, which is suitable for high-speed automotive use in one embodiment, and in others for small industrial uses such as power lawn mowers, electric generator sets, farm implements, etc.

It is another object of this invention to provide a V-4 engine which with the aid of a simple balancing device incorporated in the engine, attains essentially complete balance of all primary and secondary forces and couples and has a minimum variation of inertia torque.

A further object of this invention is to provide an automotive engine with a few number of cylinders having the essential attributes of good breathing, dynamic balance and structural rigidity, together with compactness and accessibility.

Yet another object of this invention is to provide a crankshaft which is short, rigid, and economical to manufacture.

An additional object of this invention is to provide an improved auxiliary balancing device for automotive and small industrial engines which is capable of balancing a combination of primary and secondary forces and couples.

A further object of this invention is to provide an auxiliary balancing device which is capable of substantially reducing variations in inertia torque.

A still further object of this invention is to provide an improved auxiliary balancing device particularly suited to balancing primary and secondary forces and couples and reducing inertia torque variations in V-4 engines.

It is also an object of this invention to provide an improved auxiliary balancing device which is simple and rugged in construction.

In accordance with the present invention, there is provided an engine having all primary and secondary forces and couples essentially balanced. The engine comprises a static structure and a crankshaft suitably journalled for rotation within the static structure. Also within the static structure is a cylinder having a piston adapted to reciprocate therein. The piston is provided with a means for imparting rotation to the crankshaft. Also within the static structure is a balancing means comprising a balance weight, a means for linking the balance weight to the static structure, and another means for linking or contacting the balance weight with the crankshaft, whereby on rotation of the crankshaft, the balance weight may execute an arcuate oscillating motion or straight-line motion, as required to produce primary and secondary forces for balancing the engine.

The invention comprehends the use of a crank-and-rocker balancing means where the angular disposition is preselected to correspond accurately to the angular disposition of the shaking forces of the engine.

BRIEF DESCRIPTION OF THE DRAWINGS

For a better understanding of the present invention, together with other and further objects thereof, reference is made to the following description taken in connection with the accompanying drawings and its scope will be pointed out in the appended claims. In the drawings.

DESCRIPTION OF THE PREFERRED EMBODIMENTS

Figure 1:
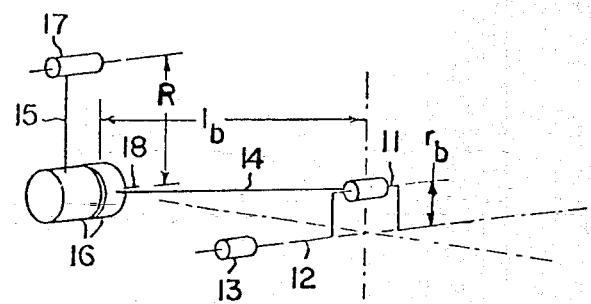
FIG. 1 is a perspective schematic view of one embodiment of the balancing means comprising a part of the present invention.

Referring now to the drawings and with particular reference to FIG. 1, there is here shown one form of the engine auxiliary balancing device which is part of the present invention. Crank 11 is a special crank which is part of the crankshaft 12 (certain conventional components not shown) for an internal-combustion engine of the reciprocating type. Crank 11 is referred to as a balance crank. The cylindrical journal portion of the balance crank 11 may be referred to as the balance crankpin. The radius of the crank circle for the balance crank 11 is $r_b$. The fixed bearing 13 represents one of the crankshaft main bearings commonly used to support a crankshaft 12. Depending upon engine design, a main bearing may or may not be required at the particular point shown. The rod 14 is a special rod having some similarity to a conventional connecting rod. To distinguish it, however, from a conventional connecting rod, rod 14 is referred to as a balance rod. The member 15 is referred to as a balance rocker. At the approximate junction of the balance rod 14 and the balance rocker 15 is an enlarged mass which is referred to as the balance weight 16. The balance weight 16 may be a part of the balance rod 14 or balance rocker 15, or its mass may be divided between the two as indicated in FIG. 1.

At one end of the balance rocker 15 is the balance rocker fixed bearing 17. The axis of the bearing is also shown, as part of the schematic representation. At the other end of the balance rocker 15 and connecting it to the balance rod 14 is the balance weight bearing 18. The bearing is designated at its axis, since the actual bearing is obscured in this view by the balance weight 16. The length of the balance rocker 15 between the axes of the bearings at its ends is designated by R. The length of the balance rod 14 between the axes of the bearings at its ends is designated by $l_b$. The symbol $W_b$ will also be used in further discussion. When the center of gravity of the balance weight 16 is on the axis of the balance weight bearing 18, $W_b$ will represent the actual weight of the balance weight 16. When the center of gravity is not on the axis of the bearing 18, $W_b$ will represent an adjusted weight which can be considered as acting at the axis or at an equivalent radius R from the axis of the guide link fixed bearing 17.

The length R of the balance rocker 15 is, for example, approximately two and one-third to three and one-third times the radius $r_b$ of the crank circle for the balance crank 11. Thus, when the crankshaft 12 rotates, as for delivering power from an engine, the balance weight 16 oscillates back and forth in an arc. The three moving "links" having lengths $r_b$, $l_b$ and R together with the engine static structure as a stationary "link", may be viewed as a form of four-link mechanism or four-bar linkage (i.e. a crank-and-rocker mechanism). This general type of linkage is known in the prior art on machinery, and its motion, which is highly complicated, is the subject of limited analyses in advanced texts and periodicals on machine design. In the present invention, however, properties of motion have been found in the specialized form of this type of linkage not heretofore recognized. It has been further found that this motion can be applied to a mass in a practicable manner for different types of engine balancing. In particular, this invention provides a method of obtaining a single motion having a combination of harmonics of acceleration which are of the frequency and magnitude desired for engine balancing, without the introduction of undesired harmonics in any significant magnitude. This is accomplished by a proper choice of length of parts, location of pivot points, and size and location of balance weight.

The balance rocker fixed bearing 17 is so located that when the balance weight 16 is midway in its arc of travel, a plane containing the axes of bearings 17 and 18 makes approximately a right angle with a plane containing the axes of bearings 13 and 18. The latter plane approximates a horizontal plane in FIG. 1, while the former approximates a vertical plane. True horizontal and vertical planes are defined for reference by the three intersecting dashed lines, which are the three principal axes of a dimetric projection. Now assume, for example, in FIG. 1 that the center of gravity of the balance weight 16 is also in the plane containing the axes of bearings 17 and 18. When the balance crank 11 is rotated at a uniform angular velocity, as in an engine at constant speed, three important harmonics of acceleration will be produced at the axis of the balance weight bearing 18. In a horizontal plane there will be a primary harmonic of acceleration having a frequency equal to the speed of rotation of the crank 11. This acceleration applied to the balance weight 16 will result in a primary harmonic shaking force in a horizontal plane having a peak value which is defined by the expression $$(W_b/g)r_b\omega^2 \quad (1)$$

where g is the acceleration of gravity and $\omega$ is the speed of rotation of the crank 11 in radians per unit time.

Also in a horizontal plane, there will be a secondary harmonic of acceleration having a frequency equal to twice the speed of rotation of the crank 11. This acceleration applied to the balance weight 16 will result in a secondary harmonic shaking force in a horizontal plane having an approximate peak value of $$(r_b/l_b)(W_b/g)r_b\omega^2 \quad (2)$$

The expressions for primary and secondary shaking forces given above for a horizontal plane are similar to the usual expressions for shaking forces produced by reciprocating parts in a cylinder. It has also been found in the case of the balance weight 16 motion that there is a sizable secondary harmonic of acceleration in a vertical plane. Its frequency is also equal to twice the speed of rotation of the crank 11. The value of this secondary harmonic is such that when applied to the balance weight 16 there will result a secondary harmonic shaking force in a vertical plane which has an approximate peak value of $$(r_b/R)(W_b/g)r_b\omega^2 \quad (3)$$

Analysis further shows for the ratios of lengths of parts chosen that the secondary harmonic of acceleration is the only harmonic of any consequence in a vertical plane. There does appear to be a trace of a primary harmonic, but contrary to the usual case with harmonics, its magnitude is extremely small relative to that of the secondary.

The sizable harmonics in the acceleration of the balance weight 16 have been found to be the primary and secondary in a horizontal plane and the secondary in a vertical plane. These harmonics have frequencies and magnitudes which make them useful in engine balancing. In addition to these harmonics, there are other inherent harmonics of higher frequency in both the horizontal and the vertical planes which are not useful. These harmonics are small enough in magnitude, however, to be of little or no consequence. The largest of these higher harmonics is a tertiary or third-order harmonic of acceleration having a frequency equal to three times the speed of rotation of the balance crank 11. There are tertiary harmonics of acceleration in both the horizontal and vertical planes, and they have approximately the same magnitude. The combined effect of these higher harmonics applied to the balance weight 16 is to produce a tertiary rotating force of approximately constant magnitude, which rotates in direction at three times the speed of rotation of the balance crank 11. The approximate magnitude of this force has been found to be $$9/8(r_b/l_b)(r_b/R)(W_b/g)r_b\omega^2$$

It has been found possible to choose lengths $r_b$, $l_b$ and R such that $(r_b/l_b)$ and $(r_b/R)$ are both small fractional values. In an application to a V-type engine, for example, the ratio $(r_b/l_b)$ is in the approximate range from (1/7) to (1/10), while the ratio $(r_b/R)$ is in the approximate range from (3/7) to (3/10). The product of these fractional values in the expression for tertiary rotating force results in a very small magnitude for that force.

For convenience in further discussion, an assembled unit such as in FIG. 1, consisting of the balance rod 14 and balance rocker 15, including the associated bearings and balance weight 16, will be referred to as a balancing unit. The balancing unit of this invention, such as described above, is applicable to several types of engines which heretofore have been recognized as having considerable amounts of primary and secondary inertia unbalance. In general, such engines have four cylinders or less. As will be pointed out hereafter, the balancing unit of the present invention makes possible the design of certain V-type, four-cylinder engines having a combination of desirable characteristics not heretofore obtainable.

To provide accurate conformity of the counterbalancing effect with the shaking forces of the engine, it is preferred that the angular position of the balance crank 11 be displaced from the dead center positions of the engine by an angle differing slightly from the conventional 90° angle. More specifically, the present invention comprehends displacing the angular position from the 90° relationship by a small phase angle of approximately $(3r_b^2/8l_bR)$ radians. Where the balancing unit lengths have a relationship as discussed above, i.e., R is approximately $2\frac{3}{8}$ to $3\frac{1}{3}$ times $r_b$ and $l_b$ is approximately 7 to 10 times $r_b$, the small phase angle is approximately 1°.

More specifically, in referring to FIG. 1, when the crank 11 is rotated 90° from the illustrated position so that the crank 11 is in the same plane as rod 14, the balance unit may be described as being in a dead center position. Thus, a pair of dead center positions is obtained at opposite sides of the upright position as shown in FIG. 1. The harmonic shaking forces developed by the engine are at a maximum when the crank or piston thereof is at either one of its dead center corresponding positions. However, the counterbalancing forces of the crank and rocker mechanism are not at a maximum when the crank 11 is at the above discussed dead center positions thereof. The maximum counterbalancing forces obtain at the above discussed small angular displacement from the dead center positions. In the illustrated embodiment of FIG. 1, the displacement is counterclockwise therefrom.

It has been found that a 1° error in the accurate positioning of the maximum counterbalancing forces relative to the corresponding angular disposition of the maximum engine shaking forces produces an unbalance of approximately 1¾% of the primary harmonic forces. Thus, the unbalanced force appears as an unbalanced force 90° from the angular position of the balancing of the engine shaking forces. By angularly displacing the counterbalancing unit as discussed above, this appreciable unbalance is effectively eliminated.

Figure 2:
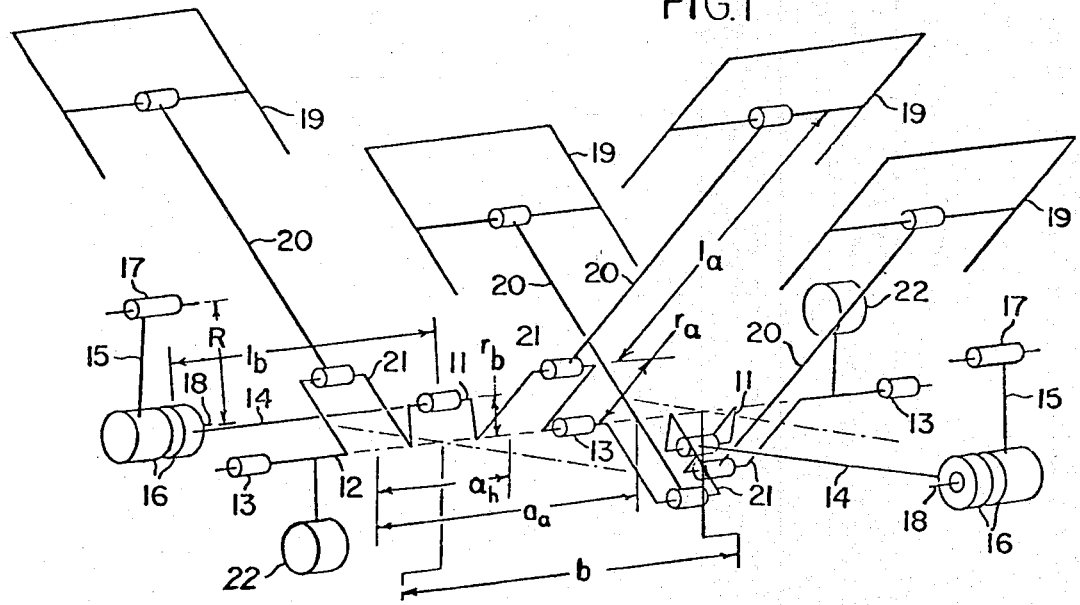
FIG. 2 is a perspective schematic view of a V-4 engine embodying the improvements of the present invention.
Figure 3:
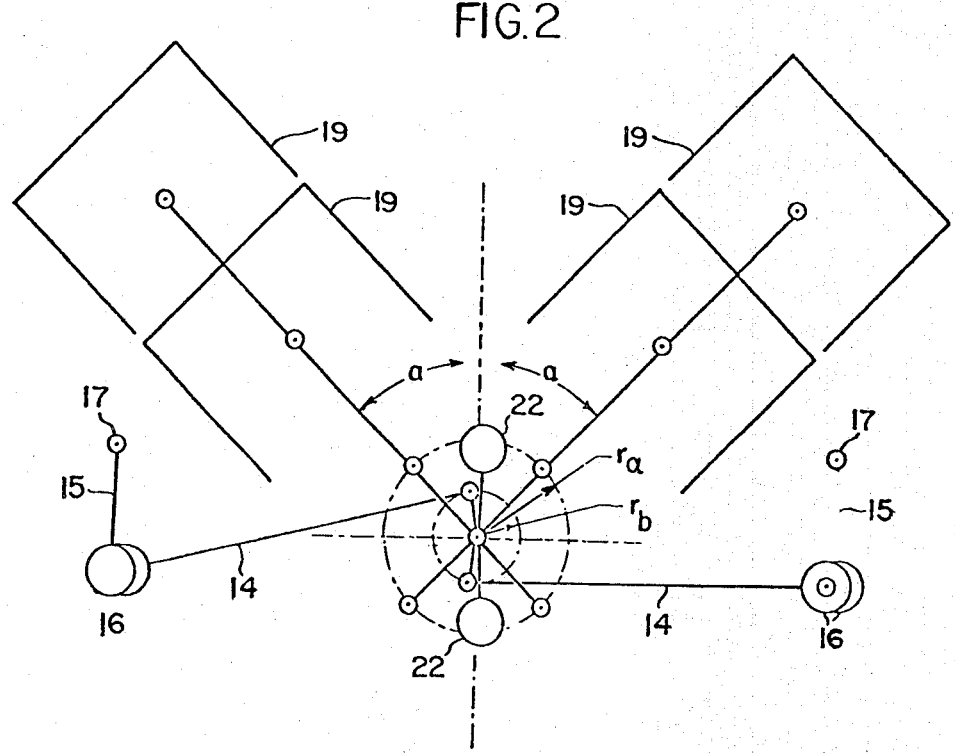
FIG. 3 is a schematic, sectional and elevational view of the engine of FIG. 2.

Illustrated in FIGS. 2 and 3 is an example of such a new V-type, four-cylinder engine having an embodiment of the balancing unit of the present invention as an integral and essential part. These views show in schematic form the principal moving components of the engine. This engine, for example, operates on the well-known four-stroke cycle. Power is developed in the usual manner for this cycle and transmitted through the four reciprocating pistons 19, to the four connecting rods 20, and to the four rotating power cranks (or power crank pins) 21 of the crankshaft 12. The two power cranks 21 serving the pair of pistons 19 in each bank of cylinders are, for example, indexed 180° from each other. Also, for example, the power cranks at either end of the engine for each of the two banks reach top or bottom center positions simultaneously. These conditions insure even firing intervals for any chosen angle $2\alpha$ between cylinder banks. For the engine shown in FIGS. 2 and 3, the angle $2\alpha$ between banks has been chosen, for example, to be ninety degrees. A greater or lesser angle $2\alpha$ could be used satisfactorily, however. Also, uneven firing intervals could be obtained by changing the angular index of the cranks 21, if such were desired.

Two balancing units, which for convenience are somewhat similar to that in FIG. 1, are used to balance the engine. The balancing units are driven from the crankshaft 12 by the two balance cranks (or balance crankpins) 11. The two balance cranks 11 are so indexed angularly between power cranks 21 at each end of the crankshaft 12, that the two balance weights 16 move inward and outward essentially in phase with each other and approximately ninety degrees out of phase with the reciprocating motion of the pistons 19. The balance rocker fixed bearings 17 are so placed, for example, that the center of gravity of each balance weight 16 makes approximately equal arcs of travel on either side of a vertical plane (for an upright engine) through the axis of its balance rocker fixed bearing 17. Also, for example, the same centers of gravity at any instant are in essentially the same horizontal plane (for an upright engine). It is the simplest choice but not necessary at any time that such plane contain the axis of the crankshaft 12. In the engine of FIGS. 2 and 3, for example, such horizontal plane is kept substantially below the axis of the crankshaft 12. Design for this condition causes the balancing units in FIG. 2 to differ slightly in orientation and appearance from that shown in FIG. 1. As in FIG. 1, a true horizontal plane is defined for reference in FIG. 2 by intersecting dashed lines.

The crankshaft 12 is shown supported by three crankshaft main bearings 13. However, a different number of main bearings could be used, if preferred. The crankshaft 12 is also shown with two crankshaft counterweights 22 near the ends of the crankshaft. These counterweights 22 are positioned to balance the crankshaft 12 and associated rotating masses in addition to balancing a rotating primary couple produced by reciprocating masses. An additional pair of counterweights could also be placed on the inner arms of the two balance cranks 11. Other arrangements of counterweights are also possible.

The static structure of the engine, now shown in the schematics of FIGS. 2 and 3, consists of the usual cylinders surrounding the pistons 19, crankcase with bulkheads supporting the main bearings 13, cylinder head, and other common attachments. Inasmuch as such a static structure is largely conventional it has been omitted in FIG. 2 so that the novel features of the invention can be emphasized. The only important departure required from the usual V-type engine block construction is an extension of portions of the side walls to provide enclosures for the two balancing units and support for the pins which act as journals for the balance rocker fixed bearings 17. The two required such enclosures may also be considered as direct extensions of the crankcase bulkheads supporting the crankshaft main bearings 13. Through proper selection of dimensions, the balancing units do not increase the overall width of the V-type engine.

Referring now, for example, to the dimensions indicated in FIG. 2, the peak magnitude of the primary harmonic shaking force developed in one cylinder is indicated by the expression $(W_a/g) r_a \omega^2$ where $W_a$ is the weight of the reciprocating parts for one cylinder (mostly that of the piston), $r_a$ is the radius of the crank circle of the power cranks 21, $\omega$ is the speed of rotation of the crankshaft 12 in radians per unit time, and g is the acceleration of gravity. The shaking force attains its peak magnitude at top and bottom center of the crank 21. The magnitude of the force is zero when the crank is 90° from top or bottom center. Considering now one bank of two cylinders operating on cranks, for example, 180° from each other, the two primary shaking forces produce a primary rocking couple in the plane of the two cylinders. The peak magnitude of this couple is $(W_a/g) r_a \omega^2 a_a$ where $a_a$ is the distance between center lines of the two cylinder bores, as indicated in FIG. 2.

If two banks having two cylinders each are considered, the magnitudes of the primary rocking couples for the two banks are seen to be equal. The couples are also in phase, but they are in different planes, separated by the angle $2\alpha$ between the two banks of cylinders. When the two couples are combined, the peak magnitude of the resultant couple is $2(W_a/g) r_a \omega^2 a_a \cos \alpha$. This resultant couple occurs in a plane midway between the cylinder banks, which is a vertical plane for an upright engine.

Referring to a description of the balancing unit of the present invention such as shown in FIG. 1, the peak magnitude of the primary harmonic shaking force in the horizontal plane was shown in equation (1) to be $(W_b/g) r_b \omega^2$. Referring next to the description of the incorporation of the two balancing units in the engine of FIGS. 2 and 3, the design and orientation of the units is such that the two primary shaking forces, described as in a horizontal plane in FIG. 1, produce a primary rocking couple in a horizontal plane for an upright engine. The peak magnitude of this couple is $(W_b/g) r_b \omega^2 b$ where b is the distance parallel to the crankshaft 12 between the centroids of the distributed unbalance forces developed by each of the two balance weights 16 in rotation about their respective balance rocker fixed bearings 17. It will be noted in FIG. 2 that b is greater than $a_a$, for example, the latter being shown to be the same, for example, as the distance between center lines of the two cylinders in one bank. The distance b is larger than $a_a$ because the center of gravity of each balance weight 16 is offset from the center line of the balance rod 14. This is a means of attaining a minimum weight for each of the two balance weights 16 while utilizing a simple construction. It is entirely possible, of course, to use other constructions for the balancing units and different relations between b and $a_a$.

The primary rocking couple $(W_b/g) r_b \omega^2 b$, developed by the balancing units, is in a horizontal plane, while the primary rocking couple $2(W_a/g) r_a \omega^2 a_a \cos \alpha$, developed by the reciprocating parts in the cylinders, is in a vertical plane. Inasmuch as one of the planes is 90 degrees from the other and one of the rocking couples is 90 degrees from the other in phase, the two rocking couples combine to give a rotating couple, which rotates with the crankshaft. The rotating couple will have a constant magnitude if the two component rocking couples are equal in peak magnitude. This occurs when $$(W_b/g) r_b \omega^2 b = 2 (W_a/g) r_a \omega^2 a_a \cos \alpha$$

This equation can be simplified to give the necessary weight of a balance weight 16 at the axis of the balance weight bearing 18, or at an equivalent radius R from the axis of the balance rocker fixed bearing 17, as $$W_b = 2 W_a (r_a/b)(a_a/b) \cos \alpha \tag{I}$$

Now, there are three primary rotating couples which must be considered: (1) the constant rotating couple obtained as above, (2) the rotating couple unbalance inherent in the uncounterweighted crankshaft itself, and (3) the rotating couple produced by the ends of the connecting rods 20 and balance rods 14 rotating with the crankshaft. These all add to produce one large couple, which rotates with the crankshaft. This couple can be directly balanced by crankshaft counterweights, such as the counterweights 22. Calculations show that the necessary balance can be obtained with counterweights 22 of reasonable size. These counterweights 22 are similar in appearance and function to the end counterweights used on many V-8 automotive engines. Intermediate counterweights could also be added, with a resulting reduction in the size of the counterweights shown in FIGS. 2 and 3.

In addition to primary harmonic shaking forces, reciprocating parts in engine cylinders develop secondary harmonic shaking forces. These forces alternate through two cycles in one revolution of the crankshaft. The peak magnitude of the secondary harmonic shaking force developed in one cylinder is approximately $$(r_a/l_a)(W_a/g) r_a \omega^2$$

Where $r_a$ is the radius of the crank circle of the power cranks 21 and $l_a$ is the length of the connecting rod 20. As in an in-line four-cylinder engine, the secondary forces in a V-4 engine are in phase and thus reach their peak values simultaneously. While the forces in the two banks are in phase, they are in different planes, which are separated by the angle $2\alpha$ between the two banks of cylinders. The resultant in a vertical plane through the axis of the crankshaft 12 for an upright V-4 engine is a secondary shaking force having a peak magnitude of approximately $$4(r_a/l_a)(W_a/g) r_a \omega^2 \cos \alpha$$

In addition, because the pairs of forces in the two banks, or planes, are not directly opposite each other, a secondary rocking couple is produced in the horizontal plane. The peak magnitude of this couple is approximately $$2(r_a/l_a)(W_a/g) r_a \omega^2 a_h \sin \alpha$$

where $a_h$ is the offset, or stagger, parallel to the crankshaft, between the two banks of cylinders, as indicated in FIG. 2.

Referring again to the description of the balancing unit of the present invention, such as shown in FIG. 1, the peak magnitude of the secondary harmonic shaking force in the horizontal plane was shown in equation (2) to be approximately
$$(r_b/l_b)(W_b/g) r_b \omega^2.$$

Referring next again to the description of the incorporation of the two balancing units in the engine of FIGS. 2 and 3, the design and orientation of the units is such that the two secondary shaking forces, described as in a horizontal plane in FIG. 1, produce a secondary rocking couple in a horizontal plane for an upright engine. The peak magnitude of this couple is approximately $$(r_b/l_b)(W_b/g) r_b \omega^2 b$$

The secondary rocking couple $(r_b/l_b)(W_b/g) r_b \omega^2 b$, developed by the balancing units, is in a horizontal plane, and the secondary rocking couple $2(r_a/l_a)(W_a/g) r_a \omega^2 a_h \sin \alpha$, developed by the reciprocating parts in the cylinders, is also in a horizontal plane. Furthermore, the phase relations of these two couples make them directly opposed to each other. For overall balance then, the two couples must be equal in peak magnitude. This occurs when $$(r_b/l_b)(W_b/g) r_b \omega^2 b = 2(r_a/l_a)(W_a/g) r_a \omega^2 a_h \sin \alpha$$

Substituting for $W_b$ from equation (I), $$(r_b/l_b)(2 W_a/g)(r_a/r_b)(a_a/b) r_b \omega^2 b \cos \alpha = 2(r_a/l_a)(W_a/g) r_a \omega^2 a_h \sin \alpha$$

This equation can be simplified to give the necessary length of the balance rod 14 approximately as $$l_b = r_b (l_a/r_a)(a_a/a_h) \cot \alpha \tag{II}$$

It was shown in the analysis initial to the above that the secondary harmonic shaking forces from the individual cylinders also give a resultant secondary shaking force in the vertical plane of the engine. The peak magnitude of this secondary shaking force in a vertical plane through the axis of the crankshaft 12 for an upright engine was shown to be approximately $$4(r_a/l_a)(W_a/g) r_a \omega^2 \cos \alpha$$

Referring again to the description of the balancing units of the present invention, such as shown in FIG. 1, the peak magnitude of the secondary harmonic shaking force in a vertical plane was shown in equation (3) to be approximately $$(r_b/R)(W_b/g)r_b\omega^2$$

Referring next again to the description of the incorporation of the two balancing units in the engine of FIGS. 2 and 3, the design and orientation of the units is such that the two secondary shaking forces, described, as in a vertical plane in FIG. 1, add to produce a resultant secondary shaking force in a vertical plane for an upright engine. The peak magnitude of this force is approximately $$2(r_b/R)(W_b/g)r_b\omega^2$$

The secondary shaking force $2(r_b/R)(W_b/g)r_b\omega^2$, developed by the balancing units, is in a vertical plane, and the secondary shaking force $4(r_a/l_a)(W_a/g)r_a\omega^2 \cos\alpha$, developed by the reciprocating parts in the cylinders, is also in a vertical plane. Also, for an engine which is symmetrical in design, for example, these two forces can be considered as coincident, since they are both fixed in point of application at all times at the geometric center of the engine. Furthermore, the phase relations of these two forces make them directly opposed to each other. For overall balance then, the two forces must be equal in peak magnitude. This occurs when $$2(r_b/R)(W_b/g)r_b\omega^2 = 4(r_a/l_a)(W_a/g)r_a\omega^2 \cos\alpha$$

Substituting for $W_b$ from equation (I), $$2(r_b/R)(2W_a/g)(r_a/r_b)(a_a/b)r_b\omega^2 \cos\alpha = 4(r_a/l_a)(W_a/g)r_a\omega^2 \cos\alpha$$

This equation can be simplified to give the necessary length of the balance rocker 15 approximately as $$R = r_b(l_a/r_a)(a_a/b) \quad \text{(III)}$$

It will be noted throughout the preceding description that all expressions for secondary forces and couples and for the lengths $l_b$ and R, derived from the motion of the reciprocating parts in a cylinder and from the motion of an oscillating balance weight 16, are described as approximate. This has been done because the simplest expressions for motion have been chosen. In the case of the motion of the reciprocating parts in a cylinder, a more accurate expression, involving a series of terms, is given in textbooks on the mechanics of engine design. In the case of the motion of an oscillating balance weight 16, more accurate expressions, also involving a series of terms, have been derived, in connection with this invention. The simple expressions, however, are much to be preferred in a description of principles, and they also have sufficient accuracy for engine layout studies. More precise expressions will change the length $l_b$ in equation (II) and the length R in equation (III) around 1 or 2 percent. Equation (I) is given in its precise form.

As previously noted, it has been found that a balancing unit has a very small unbalanced tertiary rotating force. The approximate magnitude of this force, as given in the discussion of FIG. 1, is $$(9/8)(r_b/l_b)(r_b/R)(W_b/g)r_b\omega^2$$

It has been further found that for two balancing units arranged as in FIGS. 2 and 3, the two tertiary forces are phased so that they are always in the same direction. For this reason, these forces add, and the approximate magnitude of the unbalanced tertiary rotating force for the whole engine is $$(9/4)(r_b/l_b)(r_b/R)(W_b/g)r_b\omega^2$$

With substitutions from equations (I), (II), and (III), this expression for unbalanced tertiary rotating force can be given in more convenient terms as $$9/2\,(r_a/l_a)^2(a_h/a_a)(w_a/g)r_a\omega^2 \sin\alpha$$

This is relatively a very small unbalanced force; its magnatude is approximately one-twelfth of the peak magnitude of the secondary shaking force developd at the same engine speed by a conventional in-line, four-cylinder engine having the same cylinder dimensions.

The unbalanced tertiary rotating force given above is equivalent in magnitude, but not in speed of rotation, to the force developed at the same engine speed by a static unbalance of $$9/2\,(r_a/l_a)^2(a_h/a_a)W_a r_a \sin\alpha$$

A design study has shown that this approaches in magnitude the total static unbalance permitted in present day automotive engines, in which the various moving parts are balanced by drilling or milling operations. A tertiary force also has much lower transmissibility through engine mounts. It may be concluded, therefore, that the tertiary rotating force is small enough to be ignored.

Mathematical analysis has shown that there is also a series of other small unbalanced harmonic forces inherent in the balancing units and also in the reciprocating parts of the engine. The small harmonic forces from both these sources are similar in type and comparable in magnitude to the unbalanced higher harmonics inherent in more conventional piston-type automotive engines. In the case of the subject V-4 engine, mathematical analysis has further shown that these other small unbalanced harmonic forces are considerably smaller in magnitude than the unbalanced tertiary force, which itself has been found small enough to be ignored.

As stated above, the inertia torques from the individual cylinders of a conventional four-cylinder engine add to each other. This produces a torque variation which is not desirable. One of the advantages in the use of the balancing units of the present invention, as illustrated by the embodiment of FIGS. 2 and 3, is that the characteristic inertia torque variation for a four-cylinder engine is reduced in magnitude. This is due to the fact that the inertia torque produced by the balancing units directly opposes the inertia torque produced by the reciprocating parts in the engine cylinders. A design analysis shows that the use of the balancing units reduces the characteristic inertia torque variation for a four-cylinder engine by approximately 25 to 40 percent, depending upon detail design. While the inertia torque variation is reduced, the total effective rotating inertia of the engine is increased. The latter effect is also desirable, since it reduces the amount of rotating inertia which must be built into the engine flywheel.

It is therefore apparent that when the weights and lengths of the parts of the balancing units of the present invention are chosen in accordance with equations (I), (II), and (III), using the more accurate forms for these equations, an engine such as illustrated in FIGS. 2 and 3, will be essentially balanced as to primary and secondary forces and couples. All other forces and couples are insignificant in magnitude and for all practical purposes may be ignored. In addition, the inertia torque variation is appreciably reduced with the use of such balancing units.

Equations (I), (II), and (III) specify certain relations between weights and lengths of various parts for engine balance. There remains the practical consideration of the net effect of these specific relations on engine weight, overall dimensions, and complexity. In design studies it has been found that the above required relations for balance, in addition to other important characteristics required in a modern engine, can all be obtained in a simple, compact, and rigid engine structure. Good results are obtained when the angle $2\alpha$ between cylinder banks is in the approximate range of 70 to 90 degrees. The use of the balancing units does not increase the overall width of such a V-type engine.

The following values are typical of those which may be used in the construction of an embodiment of an automobile engine patterned after the schematics of FIGS. 2 and 3, and using the more accurate forms of the simplified equations (I), (II), and (III):

| | |
|---|---|
| Number of cylinders | 4 |
| Bore | 4.25 inches |
| Stroke | 3.125 inches |
| Piston displacement | 177.3 inches$^3$ |
| $2\alpha$ | 90 degrees |
| $a_a$ | 5.60 inches |
| $a_h$ | 2.75 inches |
| b | 8.63 inches |
| $W_a$ | 2.85 pounds |
| $r_a$ | 1.563 inches |
| $l_a$ | 6.25 inches |
| $W_b$ | 5.19 pounds |
| $r_b$ | 0.787 inches |
| $l_b$ | 6.25 inches |
| R | 2.082 inches |

The bore/stroke ratio represented by the above is 1.36. This ratio is established by considerations of structural rigidity and compactness as about the optimum for this type of engine. Such ratio also happens to be very favorable for a high-speed, high-efficiency engine. The crankshaft 12 of this engine is characterized by unusually large overlaps between all adjacent journals. This permits a short and very rigid crankshaft structure.

The angle $2\alpha$ between cylinder banks chosen for the above example is ninety degrees. This is an angle for which manufacturing facilities in the industry are presently adapted. The use of this angle $2\alpha$ in the above was made possible by using balancing units in which the axes of the balance weight bearings 18 are constrained to move in paths substantially below a horizontal plane (for an upright engine) containing the axis of the crankshaft 12. Such position of the balance weight bearings 18 is obtained without departing from the previously described correct motion for the balance weights 16 by adjusting the angular position of the balance cranks 11 on the crankshaft 12. Additional benefits obtained with this construction and bank angle $2\alpha$ are lighter balance weights 16, reduced bearing loads, and a strengthened crankshaft 12.

Several variations of the crank arrangement illustrated in FIGS. 2 and 3 can be made while still using the balancing principle described in connection therewith. Identical results are obtained when either bank of cylinders is staggered ahead of the other. An alternate embodiment would simply be a mirror image of the illustration of FIGS. 2 and 3.

Another possible variation may be achieved by interchanging each balance crank 11 with the endmost power crank 21 adjacent to it without changing the angular positions of the balance cranks or power cranks. This change results in a new configuration of the crankshaft in addition to changes in the geometry of the balancing unit to reestablish balance. Identical results in this case also are obtained when either bank is staggered ahead of the other. The arrangement illustrated in FIGS. 2 and 3 or its mirror image is preferred because of its simpler and more rigid crankshaft structure.

Figure 4:
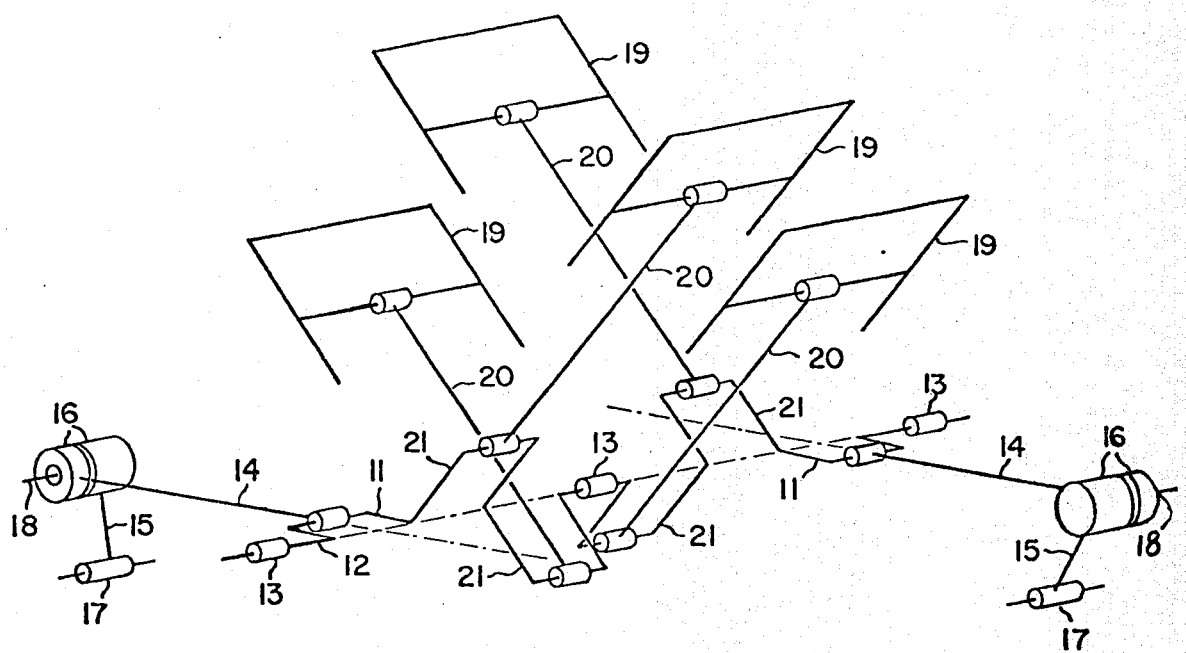
FIG. 4 is a perspective schematic view of another form of a V-4 engine embodying the improvements of the present invention.
Figure 5:
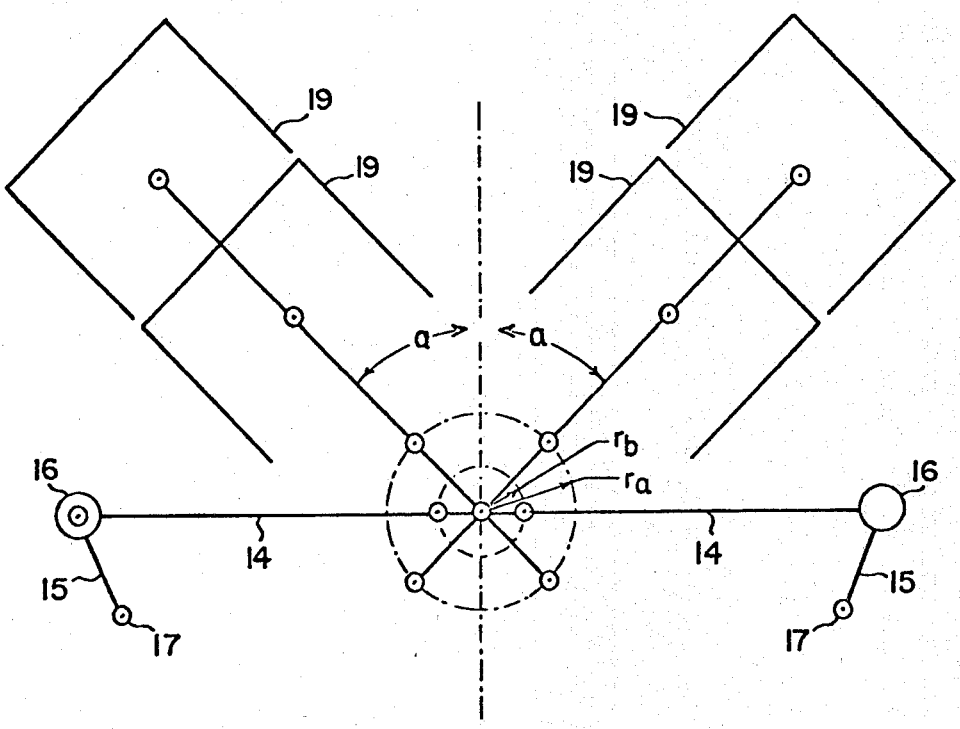
FIG. 5 is a schematic, sectional and elevational view of the engine of FIG. 4.

Illustrated in FIGS. 4 and 5 is another form of V-4 engine. This embodiment may use balancing units of the type already described. This engine also has essentially balanced primary and secondary forces and couples. The balancing units, however, increase rather than decrease the variation of inertia torque caused by reciprocating parts in the cylinders. This is a disadvantage of the engine as compared with the embodiment of FIGS. 2 and 3, which is the preferred embodiment of an engine of this type. The embodiment of FIGS. 4 and 5, however, can utilize a smaller bank angle $2\alpha$. Also, no crankshaft counterweights, such as the counterweights 22 in FIGS. 2 and 3, are required for overall balance. For this reason, no crankshaft counterweights are shown. However, counterweights can be added at any of several points along the crankshaft, as done with conventional engines, to reduce main bearing loads and structural bending forces. As with the engine of FIGS. 2 and 3, it is not necessary at any time that the horizontal plane containing the axes of the bearings 18 also contain the axis of the crankshaft 12. A variation similar to that for the engine of FIGS. 2 and 3 can be made by staggering either cylinder bank ahead of the other. Also, as with the engine of FIGS. 2 and 3, the balance cranks 11 and endmost power cranks 21 can be interchanged to give an optional balanced arrangement.

Figure 6:
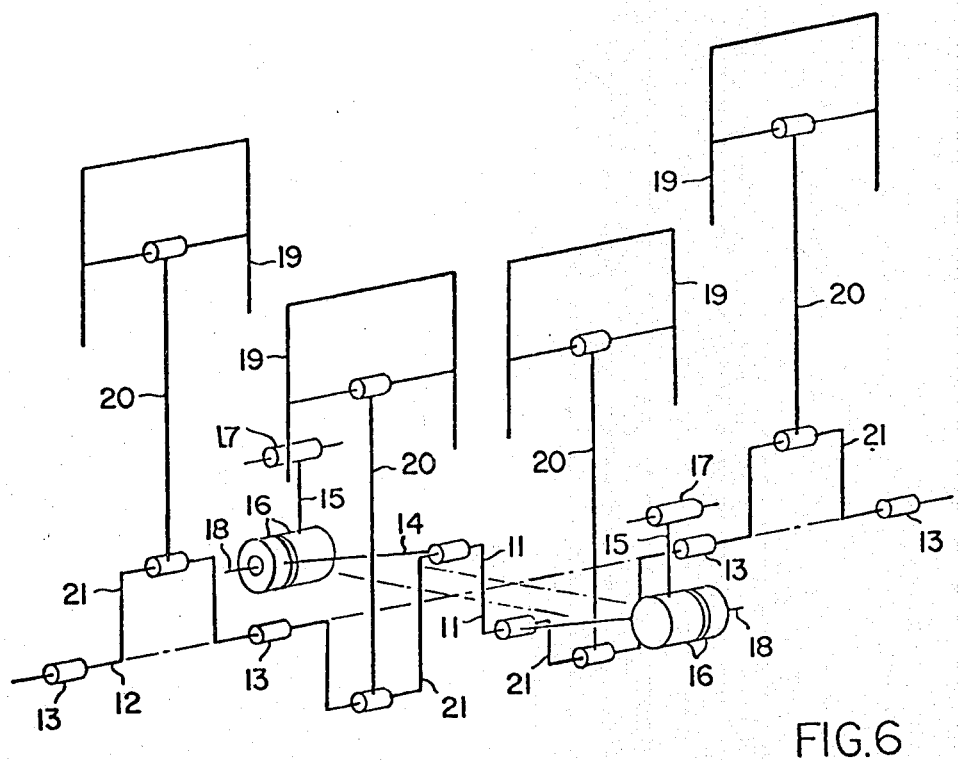
FIG. 6 is a perspective schematic view of an in-line, four-cylinder engine embodying the improvements of the present invention.

Referring now to FIG. 6, there is here illustrated an in-line, four-cylinder engine with balancing units similar to those previously described. This engine is a conventional four-cylinder engine except for the provision of the balancing units of the present invention. In the conventional engine there is a large secondary shaking force in the vertical plane, or the plane of the cylinders, representing combined secondary forces from the four cylinders. In the application of balancing units, the balance weights 16 and associated linkage are designed to produce a secondary shaking force in the vertical plane, having a peak magnitude equal to that of the combined secondary forces produced in the engine cylinders. The two sets of forces are always directly opposed in direction so that they balance each other. Also, the forces are distributed so that no couples are produced. In this application of the balancing units, only the vertical secondary forces of the balancing units are utilized. The effective masses of the two balance weights 16 are directly opposite each other, so that the primary and secondary forces in the horizontal plane from the two balance weights 16 oppose and balance each other, with no resulting couples. No crankshaft counterweights are required for overall balance. For this reason, no crankshaft counterweights are shown. However, counterweights can be added at any of several points along the crankshaft, as done with conventional engines, for the purpose of reducing main bearing loads and structural bending forces.

Several variations of the crank arrangement illustrated in FIG. 6 can be made while still using the balancing principle described in connection therewith. Identical results are obtained when the two balance cranks 11 are made to occupy positions approximately 180 degrees from the position shown in FIG. 6. The same results in most respects are also obtained when the two balance cranks 11 are made to occupy positions ninety degrees clockwise or ninety degrees counterclockwise from the positions shown in FIG. 6. In these two possible ninety-degree positions of the balance cranks the two balance rocker fixed bearings 17 must also be made to occupy fixed positions 180 degrees from the fixed positions shown in FIG. 6. However, the arrangement of balance cranks 11 shown in FIG. 6, or the first variation described above, is preferred, because the balance weights 16 in such case reduce the characteristic variation of the inertia torque of the four-cylinder engine. In the case of each crank arrangement described above, it is not necessary at any time that the horizontal plane containing the axes of the bearings 18 contain also the axis of the crankshaft 12.

Figure 7:
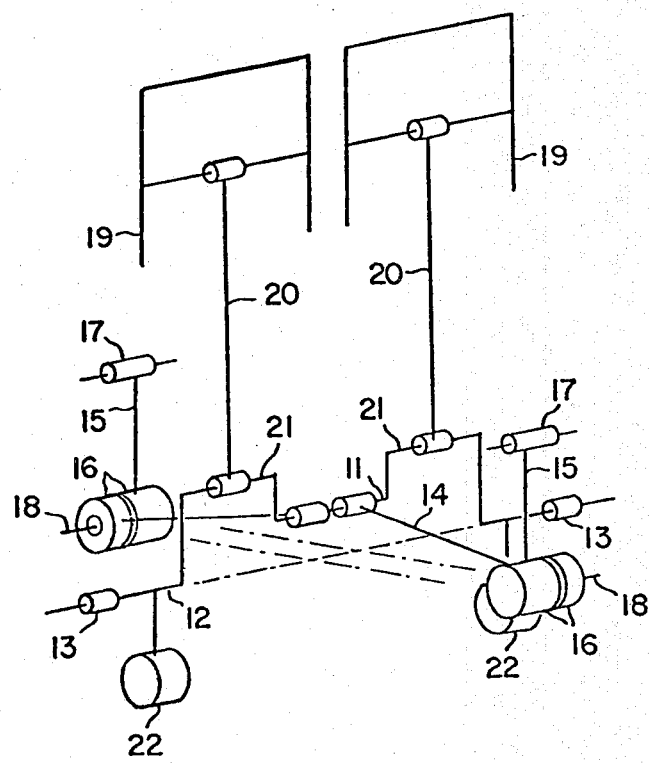
FIG. 7 is a perspective schematic view of an in-line, two-cylinder engine embodying the improvements of the present invention.

FIG. 7 illustrates an in-line, two-cylinder engine with balancing units of the present invention, such as those previously described. The conventional in-line, two-cylinder engine is not favored by many manufacturers because of the unbalance characteristics of this type of engine. There is a large primary shaking force in the vertical plane, or in the plane of the cylinders, representing combined primary forces from the two cylinders. There is also a secondary shaking force in the vertical plane, also representing combined forces. In the application of an embodiment of the balancing unit of the present invention, the balance weights 16 are designed to produce a primary shaking force in a horizontal plane having a magnitude equal to that of the primary shaking force produced in the engine cylinders in the vertical plane. These two forces combine to produce a force of constant magnitude which rotates in the same direction as the crankshaft. This rotating force can then be balanced by the two crankshaft counterweights 22 shown. As in the case of the V-4 engine, the length R of the balance rocker can be so chosen that the secondary shaking force produced by the balance weights 16 balances the secondary shaking force produced in the engine cylinders. In this application of the balancing units, only the horizontal primary forces and the vertical secondary forces are utilized. The effective masses of the two balance weights 16 are directly opposite each other so that the secondary forces in the horizontal plane from the two balance weights oppose and balance each other, with no resulting couple.

Figure 8:
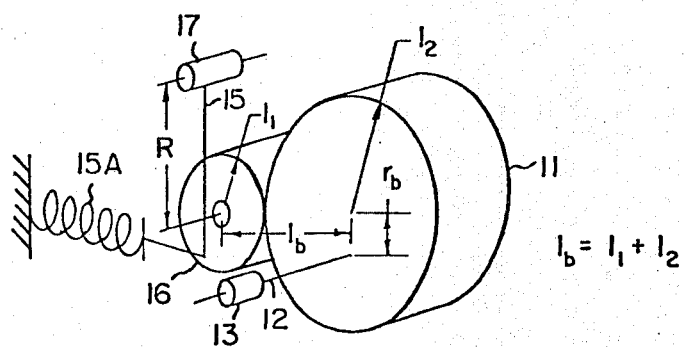
FIG. 8 is a perspective schematic view of an alternate balancing means having a structure different from that shown in FIG. 1 but which accomplishes the same results.

Referring now to FIG. 8 there is schematically illustrated a balancing unit having a structure which differs in some respects from that shown in FIG. 1, but which is designed for the same end results. The structural differences adapt the design for use with small industrial engines. Like reference numerals are used in FIG. 8 to those in FIG. 1 for corresponding components.

The principal difference between the structure shown in FIG. 1 and that shown in FIG. 8 is that balance rod 14 of FIG. 1 is eliminated in the construction of FIG. 8. Instead of such a balance rod, a spring means, schematically indicated as 15A is used. This spring means serves to keep balance weight 16 in physical contact with the driving crank pin of balance crank 11 when inertia tends to separate these components.

Spring means 15A may take a variety of forms. For example, a helical spring such as schematically illustrated may be used. In such an arrangement, one end would be anchored to the engine block or other suitable fixed or static member and the other end would suitably engage the balance weight 16. Alternately, the balance rocker 15 may be fixed at its upper end and may be provided with sufficient elasticity in its length to serve the dual function of a balance rocker and a spring.

The crank pin of the balance crank 11 preferably should have a relatively large diametered cylindrical shape shown in FIG. 8 (rather than the smaller one schematically shown in FIG. 1). As illustrated, the proportions of the balance crank 11 surface are such that they may be described as an eccentric.

Balance weight 16 is preferably formed as a cylindrical roller or with an arcuate surface in rolling contact with the crank pin.

The distance $1_b$ in FIG. 8 between the axes of the crank pin of the balance crank 11 and the balance weight 16 is the sum of the radii $1_1$ and $1_2$; $1_1$ being the radius from the axis to the outer surface of the balance weight 16, and $1_2$ being the radius of the crank pin of the balance crank 11 from its axis to its surface. Since the radii are constant, $1_b$ remains constant. Thus, the balancing unit of FIG. 8 can be designed with the same constant values of $1_b$, $r_b$ and R as the balancing unit of FIG. 1. If, in addition, the distance between the fixed bearings 13 and 17 is made the same as in the embodiment of FIG. 1, balance weight 16 of FIG. 8 is capable of the same arcuate oscillating motion as the balance weight 16 of FIG. 1. Consequently, the three algebraic expressions (1), (2) and (3), for harmonic shaking forces previously set forth for the balancing unit of FIG. 1 may apply to the balancing unit of FIG. 8.

The balancing unit of FIG. 8 provides a design which is less costly to build than the balancing unit of FIG. 1. This is due primarily to the elimination of balance rod 14 in the design of FIG. 8. However, the design of FIG. 8 is limited in application to engines which are considerably smaller than possible using the arrangement of FIG. 1, because of limitations in dimensions and load capacities. For that reason, the design of FIG. 8 would be more adapted for small and relatively inexpensive engines while the balancing unit of FIG. 1 is more adapted for larger and more expensive engines.

Figure 9:
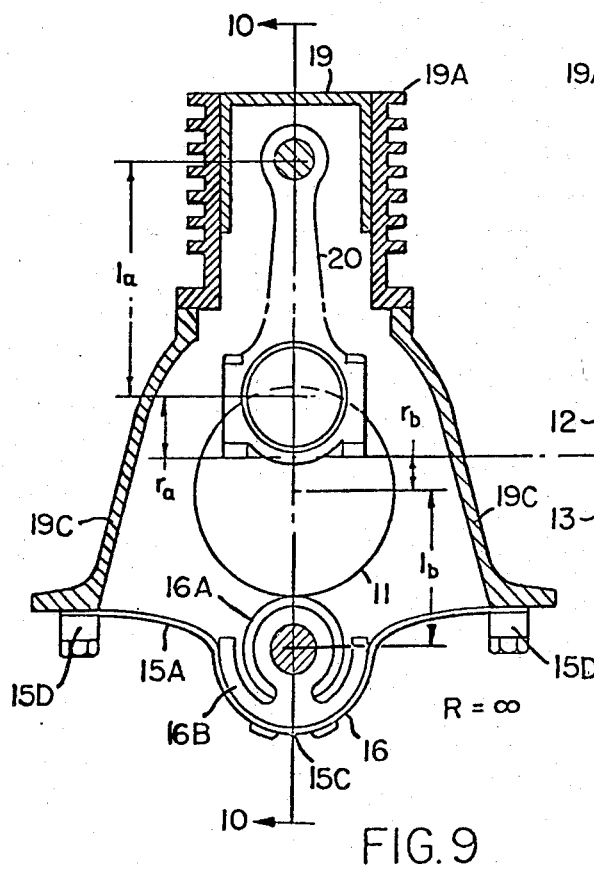
FIG. 9 is a partially schematic, sectional and elevational view of an in-line, two-cylinder engine embodying a variation of the balancing means of FIG. 8.
Figure 10:
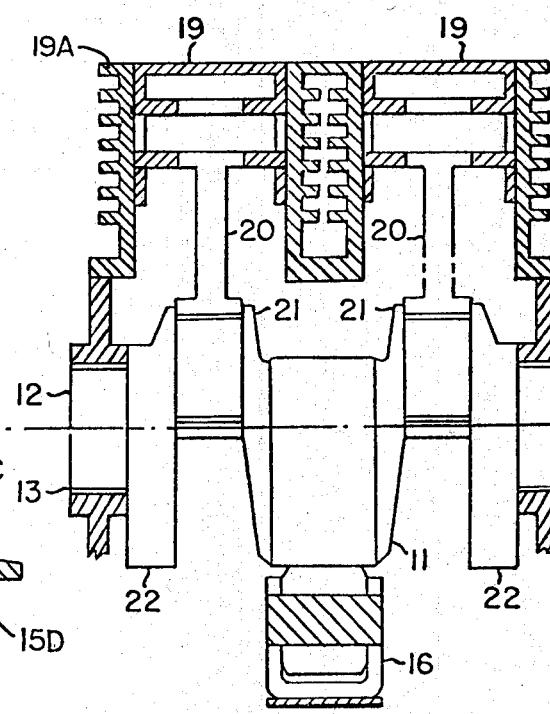
FIG. 10 is a partially schematic, sectional side elevational view of the engine of FIG. 9 taken generally along a central line 10—10 of FIG. 9.

Referring now to FIGS. 9 and 10, there is illustrated an example of a small in-line, two-cylinder, four-cycle engine utilizing a variation of the design described in connection with FIG. 8. In-line, two-cylinder, four-cycle engines, although inexpensive, have not been popular because they have relatively poor balance. In the usual in-line, two-cylinder, four-cycle engines, primary shaking forces from each of the cylinders add to each other and result in a fairly large primary shaking force in the vertical plane or in the plane of the cylinders. Similarly, the secondary shaking forces add to each other and result in a secondary shaking force in the same plane.

As illustrated, a piston 19 is located in each of the cylinders 19A. The connecting rods 20 are each conventionally connected at one end to the piston and are connected at the other end to the power cranks 21 of the crankshaft 12, which in turn is conventionally mounted in fixed bearings 13. Also secured to the crankshaft 12, preferably adjacent the power cranks 21, are the counterweights 22. The balance crank 11 of the type described in connection with FIG. 8 is secured to the crankshaft preferably intermediate counterweights 22. The cylindrical surface of this balance crank 11 is engaged continuously by the balance weight 16. This balance weight 16 in the preferred embodiment has an arcuate surface 16A adapted to engage the balance crank 11. In addition, this balance weight may be provided with a lower extending flange 16B having a surface adapted to be engaged by spring 15A. Spring 15A is a leaf spring having an intermediate section 15C adapted to receive and have secured thereto the flange 16B by suitable means. The ends of spring 15A may be secured to the static structure 19C by suitable means, such as by bolts 15D which extend through the spring into the structure 19C.

The balance crank 11 is indexed 180 degrees from the two power cranks 21. This means that the primary harmonic shaking force developed by the balance weight 16 is directly opposed throughout its cycle to the primary harmonic shaking forces developed in the two cylinders. It will be recalled that the peak value of the primary harmonic shaking force is determined by algebraic expression (1) supra. When the proper weight $W_b$ for balance weight 16 is selected, the primary force developed in the cylinders is balanced. Furthermore, the secondary harmonic shaking force developed by the balance weight 16 in the same direction as the primary force developed by the balance weight 16 is directly opposed throughout its cycle to the secondary harmonic shaking forces developed in the two cylinders. This secondary harmonic shaking force is given by algebraic expression (2) supra. When the ratio $(r_b/1_b)$ is made to equal the ratio $(r_a/1_a)$ the secondary force developed in the cylinders is balanced. In addition, all higher harmonic forces are also balanced. The symmetry of the two cylinders and the balancing unit further establishes that all couples balance.

The arrangement illustrated provides a balance crank 11 which has a dual function, which includes the primary function of driving the balance weight 16 and secondary function of serving as an effective crankshaft counterweight. Since the balance crank 11 also functions as a counterweight, it permits the reduction in size of conventional counterweights 22. The total amount of crankshaft counterweighting required is that which will balance the crankshaft and the rotating ends of the connecting rods.

The spring 15A in addition to its spring function also acts as a guide link. This spring 15A guides the balance weight 16 in a vertical straight line motion. The effective length R of the spring 15A, acting as a balance rocker in the embodiment of FIGS. 9 and 10, is infinity, (unlike R in FIG. 8, which is a finite value). With R equaling infinity, the peak value of the secondary harmonic shaking force developed in the horizontal direction is given by the algebraic expression (3) as:

$(r_b/R) (W_b/g) r_b \omega^2 = 0$

This is the desired value for utilization of the design of FIGS. 9 and 10 in a two-cylinder engine.

While the embodiment of FIGS. 9 and 10 illustrates the use of a leaf spring, a coil spring may also be used. However, if a coil spring is used, suitable guidance for straight line motion of the balance weight 16 must be provided.

The balancing unit in the engine illustrated in FIGS. 9 and 10 may also be used in one-cylinder engines. In such an arrangement the relevant parts would have a configuration as generally illustrated in FIG. 9. In such an arrangement, balance weight 16 would have to have a weight sufficient to balance the reciprocating parts in the cylinder. In a one-cylinder engine, however, the same symmetry of the balancing unit could not be obtained because of the longitudinal offset necessary between the power crank 21 and a balance crank 11 on the crank shaft. Such lack of symmetry in a one-cylinder engine might result in a small unbalanced couple in such an engine. The important overall force balance, however, would be obtained.

The present invention presents an important step forward in the art of internal-combustion engines of less than six cylinders by providing a combination of balance and other desirable features in such engines not heretofore achieved.

While there has been described what is at present considered to be the preferred embodiments of this invention, it will be obvious to those skilled in the art that various changes and modifications may be made therein without departing from the invention, and it is therefore aimed in the appended claims to cover all such changes and modifications as fall within the true spirit and scope of the invention.

I claim:

1. A balanced, V-type, four-cylinder, four-cycle internal-combustion engine comprising: two angularly separated banks of two cylinders each; a reciprocating element in each said cylinder for transmitting power; a crankshaft having four power crankpins for receiving power from said cylinders, two of said power crankpins angularly indexed with respect to the axis of said crankshaft to reach top center positions and said other two power crankpins angularly indexed to reach bottom center positions simultaneously in reference to the respective cylinders, and two balance crankpins, the aforementioned engine elements developing primary and secondary inertia shaking forces and couples; a pair of balancing units each comprising a balance rod, a balance weight, and a balance rocker and a surrounding, static structure, said balancing units being driven by said balance crankpins, said two balance crankpins disposed toward opposite ends of said crankshaft and angularly indexed to approximately opposed positions, each of said balancing units arranged with said balance rod and balance rocker pivotally interconnected at adjacent ends to form a right angle in one instance of operation and with the other end of said balance rod rotatably connected to one of said balance crankpins and the other end of said balance rocker pivotally connected to said static structure, said balance weight consisting of an enlarged mass supported by said balance rod and said balance rocker, whereby each of said balance weights may describe an arcuate, oscillating motion on rotation of said crankshaft, said balance weights having a weight and oscillating motion with primary and secondary harmonic components in two directions of such amplitudes as to produce primary and secondary forces and couples which balance said inertia shaking forces and couples produced by said engine elements.

2. A balanced, V-type, four-cycle internal-combustion engine comprising: two angularly separated cylinder banks of two cylinders each; a reciprocating element in each said cylinder for transmitting power; a crankshaft having four power crankpins for receiving power from said cylinders, two of said power crankpins for the two cylinders in either bank being angularly indexed with respect to the axis of said crankshaft to simultaneously reach a top center and a bottom center position with respect to the cylinders, two of said power crankpins for the two cylinders at either end of the engine being angularly indexed to the same position with respect to the respective cylinders, two balance crankpins, and crankshaft counterweights positioned toward opposite ends of the crankshaft, the aforementioned engine element developing primary and secondary inertia shaking forces and couples; two balancing units comprising each a balance rod, a balance weight, and a balance rocker; a surrounding static structure, each of said two balance crankpins being angularly indexed to a position within the smaller included angle between said two power crankpins at each end of the engine respectively, each of said balance crankpins being rotatably connected to one end of said balance rod, said two balance rods extending outwardly on opposite sides of said engine; and pivotal connecting means interengaging the outer ends of each balance rod with one end of each balance rocker, said balance weight consisting of an enlarged mass supported by said balance rod and balance rocker, each of said two balance rockers extending upward to approximately a vertical direction with reference to an upright engine and pivotably connected at its upper end to said surrounding static structure, whereby each of said balance weights may describe an arcuate oscillating motion on rotation of said crankshaft, said balance weights having a weight and oscillating motion with a primary harmonic component of such amplitude as to produce a primary harmonic rocking couple in a horizontal plane equal in magnitude to a primary harmonic rocking couple in a vertical plane produced by said reciprocating elements in said cylinders, said crankshaft counterweights having an unbalance and angular positions and longitudinal spacing adapted to produce a primary rotating couple which balances another primary rotating couple produced by the remainder of said crankshaft and elements rotating therewith and also said equal primary harmonic rocking couples in horizontal and vertical planes produced respectively by said balance weights and said reciprocating elements in said cylinders, said balance weights having a weight and oscillating motion with a secondary harmonic component of such amplitude as to produce a secondary harmonic rocking couple in a horizontal plane which balances another secondary harmonic rocking couple in a horizontal plane produced by said reciprocating elements in said cylinders, and said balance weights having a weight and oscillating motion with a transverse secondary harmonic component of such amplitude as to produce a secondary harmonic shaking force in a vertical direction which balances another secondary harmonic shaking force in a coincident vertical direction produced by said reciprocating elements in said cylinders.

3. The engine structure of claim 2 wherein each of the said two balance crankpins is positioned longitudinally between the said two power crankpins at each end of the engine respectively.

4. The enngine structure of claim 3 wherein each of the said two balance weights is positioned longitudinally with a moment arm length between said balance weights substantially greater than the longitudinal spacing between said two balance crankpins.

5. The engine structure of claim 2 wherein said two cylinder banks are separated by an angle of ninety degrees, and each of said balance rockers is positioned so that the axis of said pivotal connecting means between said balance rocker and said balance rod moves in a path substantially below a horizontal plane referenced to an upright engine and containing the axis of said crankshaft.

6. The engine structure of claim 2 wherein all said power crankpins are positioned longitudinally between said two balance crankpins.

7. A balanced, V-type, four-cycle, internal-combustion engine comprising: two angularly separated banks of two cylinders each; a reciprocating element in each said cylinder for transmitting power; a crankshaft having four power crankpins for receiving power from said cylinders, the two power crankpins for the two cylinders in either bank being angularly indexed with respect to the axis of said crankshaft to simultaneously reach a top center and a bottom center position with respect to the cylinders, the two power crankpins for the two cylinders at either end of the engine also being angularly indexed to simultaneously reach a top center and a bottom center position with respect to the respective cylinders, and two balance crankpins; a pair of balancing units driven by said crankpins, each balancing unit including a balance rod, a balance weight, and a balance rocker; a surrounding static structure, each of said two balance crankpins being angularly indexed within the angle opposite the smaller included angle between the said two power crankpins at each end of the engine respectively, each of said balance crankpins being rotatably connected to one end of said balance rod, said two balance rods extending outward on opposite sides of said engine; and pivotal connecting means interengaging the outer ends of each balance rod with one end of each balance rocker, said balance weight consisting of an enlarged mass supported by said balance rod and balance rocker, each of said two balance rockers extending downwardly in approximately a vertical direction with reference to an upright engine and pivotably connected at its lower end to said surrounding static structure, whereby each of said balance weights may describe an arcuate oscillating motion on rotation of said crankshaft, said balance weights having a weight and oscillating motion with a primary harmonic component of such amplitude as to produce a primary harmonic rocking couple in a horizontal plane which balances another primary harmonic rocking couple in a horizontal plane produced by said reciprocating elements in said cylinders, said balance weights having a weight and oscillating motion with a secondary harmonic component of such amplitude as to produce a secondary harmonic rocking couple in a horizontal plane which balances another secondary harmonic rocking couple in a horizontal plane produced by said reciprocating elements in said cylinders, and said balance weights having a weight and oscillating motion with a transverse secondary harmonic component of such amplitude as to produce a secondary harmonic shaking force in a vertical direction which balances another secondary harmonic shaking force in a coincident vertical direction produced by said reciprocating elements in said cylinders.

8. The engine structure of claim 7 wherein all said power crankpins are positioned longitudinally between said two balance crankpins.

9. The engine structure of claim 7 wherein each of said two balance crankpins is positioned longitudinally between said two power crankpins at each end of the engine respectively.

10. The engine structure of claim 9 wherein each of said two balance weights is positioned longitudinally with a moment arm length between said balance weights substantially greater than the longitudinal spacing between said two balance crankpins.

11. A balanced, four-cycle, internal-combustion engine comprising: four cylinders arranged in line with each other; a reciprocating element in each said cylinder for transmitting power; a crankshaft having four power crankpins for receiving power from said cylinders, the two power crankpins for the end cylinders being angularly indexed with respect to the axis of the crankshaft to the same angular position, the two power crankpins for the middle cylinders being angularly indexed 180 degrees from said power crankpins for the end cylinders, and two balance crankpins; a pair of balancing units driven by said crankpins, each balancing unit including a balance rod, a balance weight, and a balance rocker; a surrounding static structure, said two balance crankpins being angularly indexed with respect to said crankshaft approximately 180 degrees from each other and longitudinally positioned adjacent to each other in the middle of said crankshaft, each of said balance crankpins being rotatably connected to one end of said balance rod, said two balance rods extending outwardly on opposite sides of said engine; and pivotal connecting means interengaging the outer end of each said balance rod and one end of said balance rocker, said balance weight consisting of an enlarged mass supported by said balance rod and said balance rocker and longitudinally positioned in the middle of said engine with respect to cylinder spacing, each of said two balance rockers being disposed in approximately a vertical direction with reference to an upright engine and pivotably connected at its other end to said surrounding static structure whereby each of said balance weights may describe an arcuate oscillating motion on rotation of said crankshaft, and said balance weights having a weight and oscillating motion with a transverse secondary harmonic component of such amplitude as to produce a secondary harmonic shaking force in a vertical direction which balances all secondary harmonic shaking forces produced by said reciprocating elements in said cylinders.

12. The engine structure of claim 11 wherein said two balance crankpins are angularly indexed in approximately the plane containing the said four power crankpins, and said two balance rockers extend upward with reference to an upright engine from their respective connection with said balance rods.

13. The engine structure of claim 11 wherein said two balance crankpins are angularly indexed approximately at right angles to the plane containing the said four power crankpins, and said two balance rockers extend downward with reference to an upright engine from their respective connections with said balance rods.

14. A balanced four-cycle, internal-combustion engine comprising: two cylinders arranged in line with each other; a reciprocating element in each said cylinder for transmitting power; a crankshaft having two power crankpins for receiving power from said cylinders, said two power crankpins being angularly indexed with respect to said crankshaft to the same angular position; two balance crankpins; crankshaft counterweights disposed symmetrically toward opposite ends of the crankshaft; two balancing units each comprising a balance rod, a balance weight, and a balance rocker and being driven by said crankpins; a surrounding static structure, said two balance crankpins being angularly indexed to approximately the same position as said power crankpins and longitudinally positioned adjacent to each other in the middle of said crankshaft, each said balance crankpin rotatably connected to one end of said balance rod, said two balance rods extending outward on opposite sides of said engine; and pivotal connecting means interengaging the outer end of each said balance rod and one end of said balance rocker, said balance weight consisting of an enlarged mass supported by said balance rod and said balance rocker and longitudinally positioned in the middle of said engine with respect to cylinder spacing, each of said balance rockers extending upward in approximately a vertical direction with reference to an upright engine and pivotably connected at its upper end to said surrounding static structure, whereby each of said balance weights may describe an arcuate oscillating motion on rotation of said crankshaft, said balance weights having a weight and oscillating motion with a primary harmonic component of such amplitude as to produce a primary harmonic shaking force in a horizontal direction equal in magnitude to a primary harmonic shaking force in a vertical direction produced by said reciprocating elements in said cylinders, said crankshaft counterweights having an unbalance and an angular position adapted to produce a primary rotating force which balances another primary rotating force produced by the remainder of said crankshaft and elements rotating therewith and also the equal primary harmonic shaking forces in horizontal and vertical directions produced respectively by said balance weights and said reciprocating elements in said cylinders, said balance weights having their centers of mass movable in a single common plane and having a weight and oscillating motion with a transverse secondary harmonic component of such amplitude as to produce a secondary harmonic shaking force in a vertical direction which balances another secondary harmonic shaking force in approximately a coincident vertical direction produced by said reciprocating elements in said cylinders, said engine defining a dead center position of said reciprocating elements wherein the harmonic shaking forces produced thereby are a maximum, and each of said balancing units defining a dead center position when said balance crankpin and said balance rod for each said balancing unit are aligned, said balance crankpin being displaced a preselected small angle from the dead center position thereof when said reciprocating elements are 90 degrees of crank rotation from their dead center position.

15. A balanced four-cycle, internal-combustion engine comprising: a static structure having two cylinders arranged in line with each other; a reciprocating element in each of the said cylinders for transmitting power; a crankshaft having two power crankpins for receiving power from said cylinders and having a balance crankpin, said two power crankpins being angularly indexed to the same angular position on said crankshaft and said balance crankpin being angularly indexed 180 degrees from said two power crankpins, and crankshaft counterweights secured to said crankshaft and disposed symmetrically with respect to the said two power crankpins; and a balancing unit comprising a balance weight having a cylindrical surface adapted to contact said balance crankpin and be driven thereby, spring means for maintaining said cylindrical surface in contact with said balance crankpin, and connecting means connecting said balance weight to said static structure of the engine for tensioning said balance weight toward said balance crankpin and for guiding the motion of said balance weight, said balance weight adapted to describe a straight-line reciprocating motion on rotation of said crankshaft, said reciprocating motion opposed in direction at all times to the motion of said reciprocating elements in said cylinders, said balance weight having a weight and primary amplitude of motion such as to produce a primary harmonic shaking force which balances the primary harmonic shaking force produced by the reciprocating elements in said cylinders, said balance weight having a weight and secondary amplitude of motion such as to produce a secondary harmonic shaking force which balances the secondary harmonic shaking force produced by the reciprocating elements in said cylinders, and said crankshaft counterweights together with said balance crankpin having sufficient weight to balance the remainder of said crankshaft and elements rotating therewith.

16. In a reciprocating-type multicylinder engine having a static structure, a crankshaft suitably journaled for rotation within said static structure, and a plurality of cylinders within said static structure each having a piston adapted to reciprocate therein, said pistons being provided with a means for imparting rotational motion to said crankshaft whereby the engine develops primary and secondary inertia shaking forces, a pair of improved balancing devices for balancing shaking forces developed within said engine, each said balancing device comprising: a balance crankpin on said crankshaft for transmitting motion to said balancing device; a balance rod rotatably connected at one end to said balance crankpin; a balance rocker pivotably connected at one end to the other end of said balance rod and forming approximately a right angle with said balance rod in at least one instance during said motion; a balance weight comprising an enlarged mass at the connected ends of said balance rod and said balance rocker, said balance rocker pivotably connected at its other end to said static structure of the engine, said balance weight adapted to describe an arcuate, oscillating motion on rotation of said crankshaft; means including a balance weight for establishing a primary harmonic shaking force and a secondary harmonic shaking force in the direction of greatest travel of said balance weight; and means for establishing a secondary harmonic shaking force in a direction at right angles to said first mentioned direction, each of said harmonic shaking forces balancing an inertia shaking force developed by said reciprocating-type engine, said engine defining a dead center position of said piston wherein the harmonic shaking forces produced thereby are a maximum, and said balancing device defining a dead center position wherein said balance crankpin and said balance rod are aligned, said balance crankpin being displaced a preselected small angle from the dead center position thereof when said engine is in its dead center position.

17. The engine structure of claim 16 wherein said small angle is approximately equal to $(3r_b^2/8\, l_b\, R)$ radians where $r_b$ = crankshaft radius of the balance crankpin
$l_b$ = length of balance rod between inner and outer ends thereof
$R$ = length of balance rocker between the ends thereof.

18. The engine structure of claim 16 wherein said angle is approximately one degree.

* * * * *